United States Patent Office 2,840,558
Patented June 24, 1958

2,840,558

MANNICH BASES OF AROMATIC POLYKETONES

Robert W. Martin, Lafayette, Calif., assignor to Shell Development Company, New York, N. Y., a corporation of Delaware No Drawing. Application June 30, 1954
Serial No. 440,542

6 Claims. (Cl. 260—247.5)

This invention relates to aminoketones which are very useful for production of resinous products as well as being useful as stabilizers against oxidation of organic substances, as plasticizers for halogen-containing polymers, and as raw materials for manufacture of chemicals. More particularly, the invention pertains to Mannich bases of aromatic polyketones.

The compounds of the invention are Mannich bases of an aromatic polyketone containing a plurality of acyl groups, each of which is substituted on and linked directly by the carbonyl carbon atoms thereof to nuclear carbon atoms of an aromatic nucleus, and which acyl groups have a hydrogen atom linked directly to the alpha carbon atom thereof. Preferred compounds of the invention contain two amino groups and are aminoketones containing two acyl groups of a monocarboxylic acid which are linked directly by the carbonyl carbon atoms to nuclear carbon atoms of an aromatic hydrocarbon, and each alpha carbon atom of the acyl groups have linked directly thereto the methylene carbon atom of an aminomethylene group ($>$N—CH$_2$—). The distinguishing structure of these aminoketones is represented by the formula

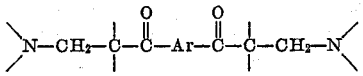

wherein Ar is the aromatic nucleus. A particularly useful group of the preferred compounds contain tertiary amino nitrogen atoms in the aminomethylene groups.

The following examples illustrate the preparation and properties of typical compounds of the invention. It is to be understood that the invention is not to be construed as limited to details given in the examples. The parts and percentages are by weight.

Example 1

The Mannich base, 1,4-bis(beta-morpholinopropionyl)-benzene dihydrochloride, was prepared as follows:

About 16.2 parts of p-diacetylbenzene, 27.2 parts of morpholine hydrochloride, and 6.6 parts of paraformaldehyde were placed in a reaction vessel equipped with a reflux condenser and heater. About 79 parts of absolute alcohol was also added as reactant solvent, and the solution was refluxed for about 1¼ hours. At the end of about 30 minutes reaction, a voluminous precipitate had separated. This precipitate was filtered off at the end of the 1¼ hours of reaction. The filtrate was returned to the reactor along with an additional 24 parts of hot ethanol which had been used to wash the filtered precipitate, some 12 parts of the latter having been obtained. About 2 parts of paraformaldehyde was added to the reactor containing the filtrate, and the mixture was again refluxed for 1½ hours. A white precipitate again formed and was filtered off. This crop of precipitate amounted to 5.5 parts. The precipitate was washed as above, and the filtrate and washing returned to the reactor. Another 2 parts of paraformaldehyde was added, and the mixture was again refluxed for 2 hours. In this instance, 4.5 parts of precipitate was formed and recovered. The total yield of product was 22 parts.

The recovered precipitate was the desired 1,4-bis(morpholino-propionyl)benzene dihydrochloride. It was a snow-white powder which was insoluble in boiling ethanol. Nitrogen analysis of product gave 6.34% nitrogen (calculated: 6.47%).

Example 2

The free Mannich base was prepared from the above-described hydrochloride salt.

About 3.6 parts of 1,4-bis(beta-morpholinopropionyl)-benzene dihydrochloride was placed in a container and aqueous sodium hydroxide (1.0 N NaOH) was added slowly. The hydrochloride salt had all dissolved by the time about half the calculated amount of caustic was added. Caustic was added until the pH, as tested by indicator paper was only faintly alkaline (pH. 7.0–7.2). This required slightly less than the calculated amount of caustic. At the neutral point, crystals started to separate and in about half an hour, the solution was thick with crystals. These were filtered off and dried. They were dissolved at room temperature (20–25° C.) in a 2:1 mixture of butanone and toluene. This solution was filtered, and petroleum ether added thereto whereupon white crystals separated. They were collected on a filter and dried.

The crystals of the Mannich base melted at 139–140° C. on top of a heated copper block. Nitrogen analysis gave 7.63% nitrogen (calculated: 7.79%).

Example 3

The Mannich base, 1,4-bis(beta-dimethylaminopropionyl)-benzene dihydrochloride was prepared.

About 12 parts of p-diacetylbenzene, 13.3 parts of dimethylamine hydrochloride, 6.7 parts of paraformaldehyde and about 40 parts of ethanol were refluxed for 1¾ hours. Then another 1.0 part of paraformaldehyde was added and refluxing continued for one hour. The heating was stopped, and the reaction mixture was diluted with 2 volumes of butanone. After standing at room temperature, crystals separated which were filtered off and dried. The crystals were recrystallized from a mixture of methanol and acetone.

The product was white crystals which melted with decomposition at 270–275° C. Analysis gave 7.41% nitrogen (calculated: 7.52%).

Example 4

The Mannich base, 1,4-bis(beta-diethylaminopropionyl)benzene dihydrochloride was prepared.

To about 32 parts of ethanol, were added 16.2 parts of p-diacetylbenzene and 6.6 parts of paraformaldehyde; and the mixture was refluxed for one hour whereupon an additional 1.0 part of paraformaldehyde was added. Refluxing was continued until two more hours passed, at which time it was noted that the reaction mixture had separated into two distinct layers, a water-white upper layer and a greenish colored lower layer. The refluxing was continued, after addition of another 1.0 part of paraformaldehyde, for two more hours. The reaction mixture was still divided into two liquid layers. A small sample of the lower layer was removed and placed in a large quantity of acetone. The material crystallized readily, giving small white crystals. A few of these crystals were used to seed the reaction mixture. Almost immediately after seeding, the entire reaction mixture crystallized. The precipitated crystals were filtered off, the filter cake was washed with acetone, and the white crystals were dried at room temperature.

The product was soluble in cold water and in boiling methanol, partly soluble in boiling ethanol, and insoluble in boiling isopropanol or in acetone. The crude product obtained above was dissolved in boiling methanol and reprecipitated by addition of acetone. The purified product was a near-white crystalline solid with M. P. 185° C. Analysis gave 6.65% nitrogen (calculated: 6.92%).

In like manner, other compounds of the invention are prepared by use of the Mannich reaction. Thus the aminoketones are obtained from reaction of the aromatic polyketone with formaldehyde and ammonia, a primary amine or a secondary amine, preferably as the hydrochloride salt of the nitrogenous reactant. For example, the reaction involved in preparing bis(beta-dimethylaminopropionyl)benzene from diacetylbenzene, formaldehyde and dimethylamine may be represented by the equation:

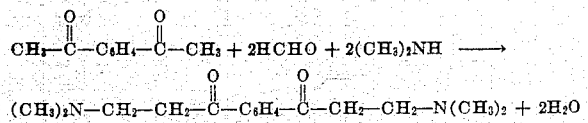

Any of the suitable aromatic polyketones are employed in preparing the aminoketones of the invention. It is only necessary that the aromatic polyketone contain a plurality of acyl groups of a monocarboxylic acid, each of which is substituted on and linked directly by the carbonyl carbon atom thereof to a nuclear carbon atom of an aromatic nucleus, and which acyl groups have one or more hydrogen atoms linked directly to the alpha carbon atom thereof. The aromatic nucleus can be mononuclear (benzoid) in structure, or polynuclear such as contained in diphenyl, diphenylpropane, and triphenylmethane compounds, including condensed ring aromatics as in naphthalene, anthracene and the like. Likewise, the acyl groups can be as contained in various monocarboxylic acids provided there is a hydrogen atom linked directly to the alpha carbon atom thereof as is the case with such acyl groups as isobutyryl, alpha-cyclohexylacetyl, alpha-phenylpropionyl and the like. Besides having the above-noted essential structure, the aromatic polyketones may contain other substituent radicals such as alkyl, alkenyl, aryl, amino, halo, hydroxy, alkoxy, carboxyl, or acyloxy groups, regardless of whether or not these groups entail reaction with one or both of the other reactants, such reactive groups merely complicating the structure of the formed amino-ketones of the invention. Preferably, the aminoketones are obtained from aromatic polyketones containing two acyl groups of a saturated fatty acid of 2 to 10 carbon atoms, each of which acyl groups have a hydrogen atom linked directly to the alpha carbon atom thereof, and are linked directly by the carbonyl carbon atom to a nuclear carbon atom of a divalent aromatic hydrocarbon group. Thus besides the aminoketones derived from 1,4-diacetylbenzene in the above examples, other aminoketones are obtained with use in place of the diacetylbenzene such representative aromatic polyketones as 1,2-diacetylbenzene, 1,3-diacetylbenzene, 1,4-diacetyl-2,3,5,6-tetrachlorobenzene, 1,2-dipropionylbenzene, 1,3-dipropionylbenzene, 1,4-dipropionylbenzene, 1,3-diacetyl-2,4-dimethylbenzene, 1,3-diacetyl-2,4,6-trimethylbenzene, 1,3-diacetyl-2,4,5,6-tetramethylbenzene, 1,4-diacetyl-2,3,5,6-tetramethylbenzene, 1,3-dibutyryl-2,4,6-trimethylbenzene, 1,3-diisobutyryl-2,4,6-trimethylbenzene, 1,3-diisovaleryl-2,4,6-trimethylbenzene, 1,3-diacetyl-5-ethylbenzene, 1,5-diacetyl-2-ethylbenzene, 2,2'-diacetyldiphenyl, 4,4'-diacetyldiphenyl, 4,4'-diacetyldiphenylmethane, 1,3-diacetyl-2,4,5-trimethoxybenzene, 9,10-diacetylphenanthrene, 3,9-diacetylperylene, 3,9-dipropionylperylene, 1,3,5-triacetylbenzene, 1,3,5 - triacetyl - 2,4,6 - trimethylbenzene, etc. These known aromatic polyketones as well as others used in preparing the aminoketones of the invention are obtained by one or more of such methods as the Friedel-Crafts reaction of an acyl chloride with the aromatic compound using aluminum chloride as catalyst, reacting an aromatic polycarboxylic acid chloride with a zinc hydrocarbon compound, or reacting an aromatic polycarboxylic acid diethyl amide with the appropriate Grignard reagent, e. g. preparation of 1,3-dipropionylbenzene from isophthalic acid diethyl amide and ethyl magnesium bromide.

Formaldehyde used as reactant may come from either ordinary aqueous formaldehyde, e. g. formalin, or formaldehyde-engendering compounds such as paraformaldehyde, trioxymethylene and the like. Because of convenience, use of paraformaldehyde is preferred.

As nitrogenous reactant, there is used a primary or secondary amine. Besides containing only a single nitrogen atom, such amines may contain, if desired, other substituent groups and have varied structures which are aliphatic, alicyclic, aromatic and/or heterocyclic in character. Representative amines used as in the above examples include methylamine, isopropylamine, stearylamine, allylamine, cyclohexylamine, benzylamine, ethanolamine, beta - chloroethylamine, beta - phenylethylamine, alpha-aminoacetophenone, 3,4 - methylenedioxybenzylamine, dimethylamine, diethylamine, diisopropylamine, didecylamine, dicyclohexylamine, methylethylamine, dibenzylamine, methylaniline, piperidine, morpholine, tetrahydroisoquinoline and the like. The nitrogenous compound contains a single amino nitrogen atom, as includes ammonia, and the nitrogen atom has linked thereto 1 to 3 hydrogen atoms. Usually the nitrogenous reactant is used as a hydrohalide salt thereof, in which case the formed Mannich base of the polyacyl aromatic compound is also obtained as the hydrohalide salt.

As described in the aforementioned examples, the reaction is effected by bringing the three reactants together and heating the reaction mixture at about 50° C. to 175° C. Higher or lower temperatures may be used if desired. The proportion of ketone, formaldehyde and nitrogenous compound may be varied over a considerable range. Ordinarily, there is used about a 10 to 20% excess of the equivalent quantity of formaldehyde and nitrogenous compound needed to combine with the aromatic polyketone. Since formaldehyde is quite volatile, introduction of additional formaldehyde during the course of the reaction is helpful in increasing the yield of Mannich base. When ammonia or a primary amine is used as reactant, it is advantageous to have a generous excess of this compound present in order to suppress formation of undesired higher condensation products from further reaction of the formed base with formaldehyde and polyketone. The use of a secondary amine is not subject to such by-product formation.

While the reaction mixture may contain considerable water as from use of aqueous formaldehyde, it is preferred to effect the reaction in the presence of an organic solvent. For this purpose, methanol and ethanol are particularly suitable. The product is recovered in many cases by simply cooling the reaction mixture and filtering off the formed Mannich base. The addition to the crude reaction mixture of a non-solvent for the Mannich base often assists precipitation and recovery to be accomplished.

The new Mannich bases of the invention, whether as free bases or hydrohalide salts, are crystalline solids at ordinary temperature. Typical, but non-limiting, compounds of the invention include, besides those given in the earlier examples, 1,4-bis(beta-aminopropionyl)benzene, 1,3 - bis(alpha - aminoethylisovalyryl)-2-methylbenzene, 1,4 - bis(alpha - cyclohexyl - beta-aminopropionyl)benzene, 1,3,5 - tris(beta-aminopropionyl)benzene, 1,4-bis(beta - methylaminopropionyl)benzene, 1,2-bis(beta-cyclohexylaminostearoyl)benzene, 1,4 - bis(beta-benzyl-aminopropionyl)naphthalene, 1,3 - bis(beta-chloroethyl-aminopropionyl)-2,4,6-trimethylbenzene, 1,3-bis(beta-dimethylaminopropionyl)benzene, 1,4 - bis(beta-dimethyl-aminopropionyl) - 2,3,5,6 - tetrachlorobenzene, 1,4 - bis(beta - piperidinylaminopropionyl) - 2,3,5,6 - tetramethylbenzene, 1,3 - bis(beta - diethylaminomethylpropionyl)-

2,4,6-triethylbenzene, 4,4'-bis(beta-morpholinopropionyl)diphenyl, 1,3,5 - tris(beta - dibenzylaminomethylcapryl)benzene, 3,9 - bis(beta - diallylaminopropionyl)perylene, and the like as well as the compounds obtained from reaction of any of the aforementioned particular aromatic ketones with any of the aforementioned primary or secondary amines or ammonia and formaldehyde.

The aminoketones containing two tertiary amino groups that are derived from reaction of a diacyl aromatic compound with a secondary amine constitute a preferred class of compounds of the invention. These aminoketones have exceptional utility in that they may be reacted with $H_2S$ or a dithiol to give resinous products of high molecular weight suitable for use as synthetic fibers. Such resinous products are described and claimed in my copending application, Ser. No. 440,543, filed of even date herewith.

I claim as my invention:

1. An aminoketone compound having the following structural formula

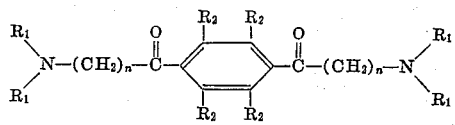

wherein $R_1$ represents a lower alkyl radical and each pair of $R_1$'s attached to the same nitrogen atom form morpholine when taken together, $R_2$ is selected from the group consisting of methyl, methoxy, chlorine and hydrogen, and $n$ is a whole number not greater than 2.

2. 1,4-bis(beta-dimethylaminopropionyl)benzene.
3. 1,4-bis(beta-diethylaminopropionyl)benzene.
4. 1,4-bis(beta-morpholinopropionyl)benzene.
5. 1,4 - bis(beta - dimethylaminopropionyl) - 2,3,5,6-tetramethylbenzene.
6. 1,4 - bis(beta - morpholinopropionyl) - 2,3,5,6-tetrachlorobenzene.

References Cited in the file of this patent

UNITED STATES PATENTS

| | | |
|---|---|---|
| 2,489,668 | Plati | Nov. 29, 1949 |
| 2,686,808 | Sprague | Aug. 17, 1954 |

FOREIGN PATENTS

| | | |
|---|---|---|
| 379,950 | Germany | Oct. 14, 1921 |

OTHER REFERENCES

Lieberman et al.: Jour. Org. Chem., vol. 14, pp. 1001–12 (1949).

Mannich et al.: Berichte, vol. 55, pp. 356–65 (1922).

Beilstein's Handbook of Org. Chem., vol. VII, p. 686 (1925).